United States Patent [19]
Ferguson et al.

[11] Patent Number: 6,061,740
[45] Date of Patent: *May 9, 2000

[54] METHOD AND APPARATUS FOR HETEROGENEOUS NETWORK MANAGEMENT

[75] Inventors: Daniel T. Ferguson, Orem; Nick N. Nikols, Draper; Bryan J. Cardoza, American Fork; Steven F. Sonntag, Salt Lake City; Richard S. Bell, Sandy; Patrick L. Campbell; Betty Graupe, both of Salt Lake City, all of Utah

[73] Assignee: Novell, Inc., Orem, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/893,305

[22] Filed: Jul. 15, 1997

Related U.S. Application Data

[63] Continuation-in-part of application No. 08/762,561, Dec. 9, 1996.

[51] Int. Cl.$^7$ ........................................ G06F 15/16
[52] U.S. Cl. .................... 709/246; 709/201; 709/303; 709/248
[58] Field of Search .................. 395/200.31, 200.78, 395/200.76, 683; 709/201, 248, 246, 303

[56] References Cited

U.S. PATENT DOCUMENTS

| | | |
|---|---|---|
| 4,914,571 | 4/1990 | Baratz et al. . |
| 5,133,075 | 7/1992 | Risch ........................................ 395/800 |
| 5,175,852 | 12/1992 | Johnson et al. . |
| 5,388,255 | 2/1995 | Pytlik et al. . |
| 5,442,791 | 8/1995 | Wrabetz et al. ........................ 395/650 |
| 5,465,365 | 11/1995 | Winterbottom . |
| 5,483,652 | 1/1996 | Sudama et al. . |
| 5,491,817 | 2/1996 | Gopal et al. . |
| 5,495,607 | 2/1996 | Pisello et al. . |
| 5,548,726 | 8/1996 | Pettus ................................. 395/200.09 |
| 5,561,799 | 10/1996 | Khalidi et al. . |
| 5,579,469 | 11/1996 | Pike . |
| 5,581,764 | 12/1996 | Fitzgerald et al. . |
| 5,596,723 | 1/1997 | Romohr . |
| 5,596,744 | 1/1997 | Dao et al. . |
| 5,608,903 | 3/1997 | Prasad et al. . |
| 5,617,568 | 4/1997 | Ault et al. . |
| 5,734,898 | 3/1998 | He ........................................... 395/619 |
| 5,734,902 | 3/1998 | Atkins et al. ........................... 395/683 |
| 5,768,511 | 6/1998 | Galvin et al. ...................... 395/200.33 |
| 5,787,262 | 7/1998 | Shakib et al. ..................... 395/200.35 |
| 5,832,487 | 11/1998 | Olds et al. ................................ 707/10 |
| 5,864,843 | 1/1999 | Carino, Jr. et al. ........................ 707/4 |

OTHER PUBLICATIONS

Mike Accetta, George Robertson, M. Satyanarayanan and Mary Thompson, *The Design of a Network–Based Central File System*, Aug. 1980.

Walter F. Tichy and Zuwang Ruan, *Towards a Distributed File System*, USENIX Association Software Tools Users Group, Summer Conference, Jun. 1984.

(List continued on next page.)

*Primary Examiner*—Zarni Maung
*Assistant Examiner*—Saleh Najjar
*Attorney, Agent, or Firm*—Dinsmore & Shohl LLP

[57] ABSTRACT

A method and apparatus for managing a heterogeneous network is disclosed. A first computer system has one or more identities. A management service on a second computer system manages objects on the second computer system. One or more objects on the second computer system represent the one or more identities and are adapted to be managed by the management service. An event monitor operating on the second computer system is operative to send messages relating to changes to the one or more objects. A replication agent operating on the first computer system is operative to receive messages from the event monitor and is operative to synchronize the one or more identities to the changes made to the one or more objects.

31 Claims, 8 Drawing Sheets

OTHER PUBLICATIONS

Keith A. Lantz, Judy L. Edighoffer and Bruce L. Hitson, *Towards a Universal Directory Service,* Fourth Annual ACM Symposium on Principles of Distributed Computing, Aug. 1985.

Douglas Comer and Thomas P. Murtagh, *The Tilde File Scheme,* 6th International Conference on Distributed Computing Systems, May 1986.

R. Rodriguez, M. Koehler and R. Hyde, *The Generic File System,* USENIX Association Summer Conference, Jun. 1986.

Larry Peterson, Norman Hutchinson, Sean O'Malley and Herman Rao, *The x–kernel: A Platform for Accessing Internet Resources,* IEEEComputer, May 1990.

B. Clifford Neuman, *The Prospero File System A Global File System Based on the Virtual System Model,* Computing Systems, vol. 5, No. 4, Fall 1992.

Herman C. Rao and Larry L. Peterson, *Accessing Files in an Internet: The Jade File System,* IEEE Transactions on Software Engineering, vol. 19, No. 6, Jun. 1993.

John S. Heidemann and Gerald J. Popek, *File–System Development with Stackable Layers,* ACM Transactions on Computer Systems, vol. 12, No. 1, Feb. 1994.

Barb Cole, *Directories go global,* NetworkWorld, Aug. 12, 1996, vol. 13, No. 33.

Daniel J. Blum, *LDAP: Helping Directories Get Along,* Business Communications Review, Dec. 1996.

Christy Hudigins–Bonafield, *Metadirectories Primed to Unify Enterprise,* Network Computing Jan. 15, 1997.

Robert Richardson, *Stoking an Inferno on the Internet,* ZD Internet Magazine, Feb. 1997.

Albert D. Alexandrov, Maximilian Ibel, Klaus E. Schauser and Chris J. Scheiman, *Extending the Operating System at the User Level: the Ufo Global File System,* USENIX Association, 1997 Annual Technical Conference.

Matthew Woollacott, *Lucent's Inferno preparing to provide a universal NOS,* Infoworld, Mar. 17, 1997.

Florence Olsen, *Fight user directory chaos,* Government Computer News, Feb. 10, 1997.

David L. Cohn, Michael R. Casey, Paul M. Greenawalt, John E. Saldanha, *A Universal Distributed Programming Paradigm for Multiple Operating Systems,* USENIX Association, Distributed & Multiprocessor Systems (SEDMS III).

Security Categories symmetric systems asymmetric systems

METHOD AND APPARATUS FOR HETEROGENEOUS NETWORK MANAGEMENT

RELATED APPLICATIONS

This is a continuation-in-part of application Ser. No. 08/762,561, filed on Dec. 9, 1996 pending.

TECHNICAL FIELD

The present invention relates generally managing network resources, and will be specifically disclosed as a method and apparatus for managing a heterogenous network through a distributed directory.

BACKGROUND OF THE INVENTION

The virtual explosion of technological advances in microelectronics, digital computers, and software have changed the face of modern society. In fact, these technological advances have become so important and pervasive that some people refer to this explosion as the "Information Revolution." Through telephone lines, networks, satellite communications and the like, information is routinely generated, transmitted, received and processed.

When a group of computers are connected to one another, such as in a client/server network, a management service is typically used to organize and administer information and resources across the network. One type of management service uses a distributed directory, such as NOVELL DIRECTORY SERVICES ("NDS"). Typically implemented over a computer network, a distributed directory is a kind of database that includes a collection of objects that represent a variety of things. For instance, some typical objects represent users, groups, printers, computers, and the like. Usually, the objects in the distributed directory are organized in a hierarchical structure, which is sometimes represented as a tree. Such a structure facilitates a logical organization understandable to human users. Another example of a management service is one organized in domains, such as the SECURITY ACCOUNTS MANAGER ("SAM").

Generally, the management service for a computer system depends upon the underlying operating system on which the computer system is using. For instance, NDS is designed to run on the NETWARE operating system, whereas SAM is designed to run on the WINDOWS NT operating system. In many instances, however, it is desirable to have a network which includes several different computers using different operating systems. Such a network is sometimes referred to as a heterogenous network.

Managing the information and resources in heterogenous networks has traditionally been cumbersome and expensive. This is because different management services tend to be incompatible with one another. In the past, network administrators were required to use the management services in each of the several computer systems, which required duplicated efforts as well as expertise on the multiple management services. In addition, network administration with multiple discrete management services is prone to human errors in translating changes between the various management services. Therefore, there is a need for a centralized management service capable of administering a heterogenous network.

SUMMARY OF THE INVENTION

Accordingly, an object of the invention is to provide a method and apparatus for the centralized management of heterogenous networks.

A further object of the invention is to provide an improved method and apparatus for managing services in a network.

Yet another object of the invention is a method and apparatus for managing objects in different computer systems.

Additional objectives, advantages and novel features of the invention will be set forth in the description that follows and, in part, will become apparent to those skilled in the art upon examining or practicing the invention. The objects and advantages of the invention may be realized and obtained by means of the instrumentalities and combinations particularly pointed out in the appended claims.

One aspect of the present invention is a computer system comprising first and second computers interconnected through a communication link. A first set of objects are on the first computer and are being accessed by a service operating on the first computer. A distributed directory operating on the second computer comprises a plurality of editable objects, each of which have one or more attributes with associated values. The second set of objects in the distributed directory correspond to the first set of objects. An event monitor on the second computer is operative to send messages relating to changes detected in the second set of objects. A replication agent on the first computer receives messages from the event monitor over the communication link and modifies the first set of objects to correspond to the changes detected in the second set of objects.

Another aspect of the present invention is a method for managing a service on a first computer system through a management service operating on a second computer system. The service has access to a first set of objects on the first computer system. The method comprises creating a second set of objects accessible to the management service for representing the first set of objects. The second set of objects are modified, and such modifications are detected. Information about the modification on the second set of objects are transmitted to the first computer system. The first set of objects are modified on the first computer system to correspond to the modification to the second set of objects in the second computer system.

Yet another aspect of the present invention is an administration system for managing one or more identities on a first computer system. A management service on a second computer system manages objects on the second computer system. One or more objects on the second computer system represent the one or more identities. The one or more objects are adapted to be managed by the management service. An event monitor operating on the second computer system is operative to send messages relating to changes to the one or more objects. A replication agent operating on the first computer system is operative to receive messages from the event monitor and is operative to synchronize the one or more identities to the changes made to the one or more objects.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers telecommunicate between each other and share information, applications and/or services. Sometimes in this setting, the various computers are referred to as nodes, which is a generic term referring to a point in a interconnected system. One type of computer network employs a client/server architecture, wherein the portions of network applications that interact with human users are typically separated from the portions of network applications that process requests and information. Often, the portions of an application that interact with users or access network resources are called client applications or client software, and the portions of an application that process requests and information are called server applications or server software. Client machines tend to run client software and server machines tend to run server software, however a server can be a client as well.

Figure 1:
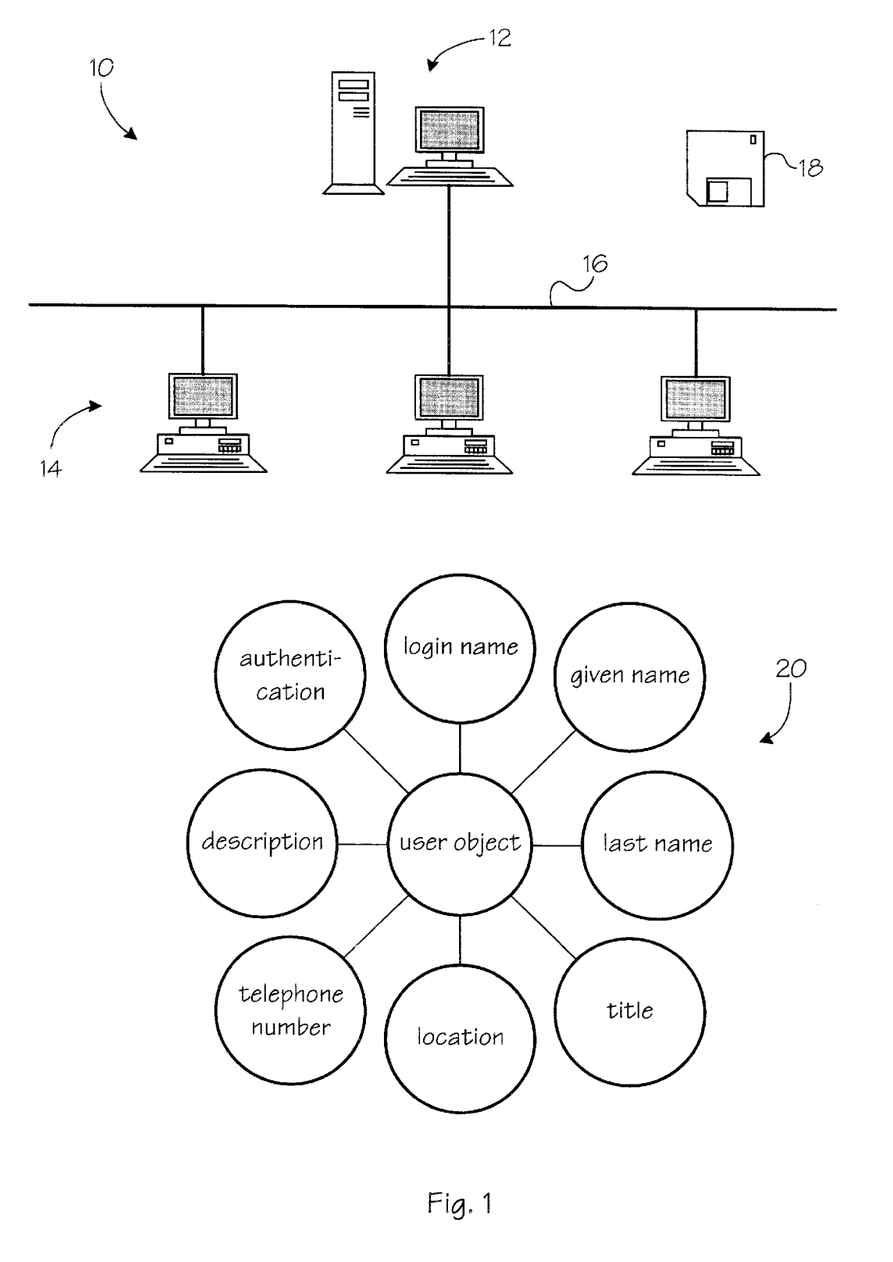
FIG. 1 depicts an example of interconnected nodes, a computer readable medium, and an object with several associated attributes.

FIG. 1 illustrates a sample client/server network 10. As one with ordinary skill in the art will readily appreciate, a client/server network is only one type of network, and a variety of other configurations, such as peer-to-peer connections, are also considered computer networks. In a client/server network, a plurality of nodes are interconnected such that the various nodes send and/or receive information to/from one another. As shown here, a server node 12 is interconnected to a plurality of client nodes 14 using a communication link 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable medium can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Some types of computer readable medium, which are sometimes described as being nonvolatile, can retain data in the absence of power so that the information is available when power is restored.

Management Services

Management services are used to organize and administer information and resources on computer systems. While management services are most widely used in network environments, they can also be used in stand-alone machines. One management service for managing and/or accessing information and resources on a network of interconnected nodes is a synchronized hierarchical database called a distributed directory. One example of a distributed directory is the NOVELL DIRECTORY SERVICES ("NDS"), which is based on the X.500 network services protocol developed and published by the CCITT and Open Systems Interconnection Consortium. A distributed directory is a database in the sense that information is stored as opposed to the traditional definition under Codd and Date. Usually in the context of a client/server network, a distributed directory spans and is shared by multiple networking server nodes, although a single server node can also maintain a distributed directory. While distributed directories are often used with client/server networks, they are not necessarily limited to the context of such networks. Information on the distributed directory can be created, read, modified, and shared by other nodes, such as client nodes or other server nodes, who have applicable access rights to the distributed directory. Other examples of management services include STREET TALK III by BANYAN, and the SECURITY ACCOUNTS MANAGER ("SAM") by MICROSOFT. In addition, many applications maintain their own data/resource repositories which can be managed. For instance, MICROSOFT EXCHANGE maintains a database of mailboxes, recipient list, etc., all of which can be associated to users.

The management services contain a collection of objects, sometimes referred to as identities, with associated attributes or properties. For example, the object 20 is a user object that represents a human user. Beyond representing users, objects in the management services represent things that humans relate to when dealing with computers. For instance, some typical objects might represent printers, print queues, files, resources, computers, and the like. In addition, objects can represent non-computer related things such as countries, companies, organizations, departments, buildings, and the like. Furthermore, objects can be organizational in nature to group other objects together. As one with ordinary skill in the art will readily appreciate, objects can represent virtually anything, whether imaginary or real.

The object 20 has a variety of associated attributes, such as "Given Name", "Last Name", "Title", etc. Each associated attribute has a value, however, sometimes values are not associated with an attribute. For example, the value for the property "Given Name" might be "George". An attribute is usually based on an attribute type, which has an attribute syntax. The data which can be entered as a value associated with the attribute is dictated by the attribute syntax. For instance, NDS version 4.1 includes the following attribute types: Back Link, Boolean, Case Exact String, Case Ignore List, Case Ignore String, Class Name, Counter, Distinguished Name, E-mail Address, Facsimile Telephone Number, Hold, Integer, Interval, Net Address, Numeric String, Object ACL, Octet List, Octet String, Path, Postal Address, Printable String, Replica Pointer, Stream, Telephone Number, Time, Timestamp, Typed Name, and Unknown. Each of these attribute types has a predetermined attribute syntax appropriate for the type of data that will be entered as a value.

Distributed Directory

As discussed above, a distributed directory is just one type of management service. The structure of the distributed directory is typically governed by a schema. The schema defines the rules for adding and managing objects and attributes of objects in the distributed directory. These rules are specified through a data dictionary that provides a standard set of data types or classes from which objects can be created. Each object in the distributed directory belongs to an object class that specifies which attributes are associated with the object. Generally, the schema is extensible so that it may be tailored to modify existing classes or add new classes.

The schema controls not only the structure of the individual objects, but also the relationship among the objects in the distributed directory. In controlling this relationship, the schema specifies subordination among object classes. That is, for every object there is a group of object classes from which subordinate objects can be formed. Objects that can contain other objects are called container objects, which are the building blocks of the distributed directory. Objects that cannot contain other objects are known as non-container or leaf objects.

Figure 2:
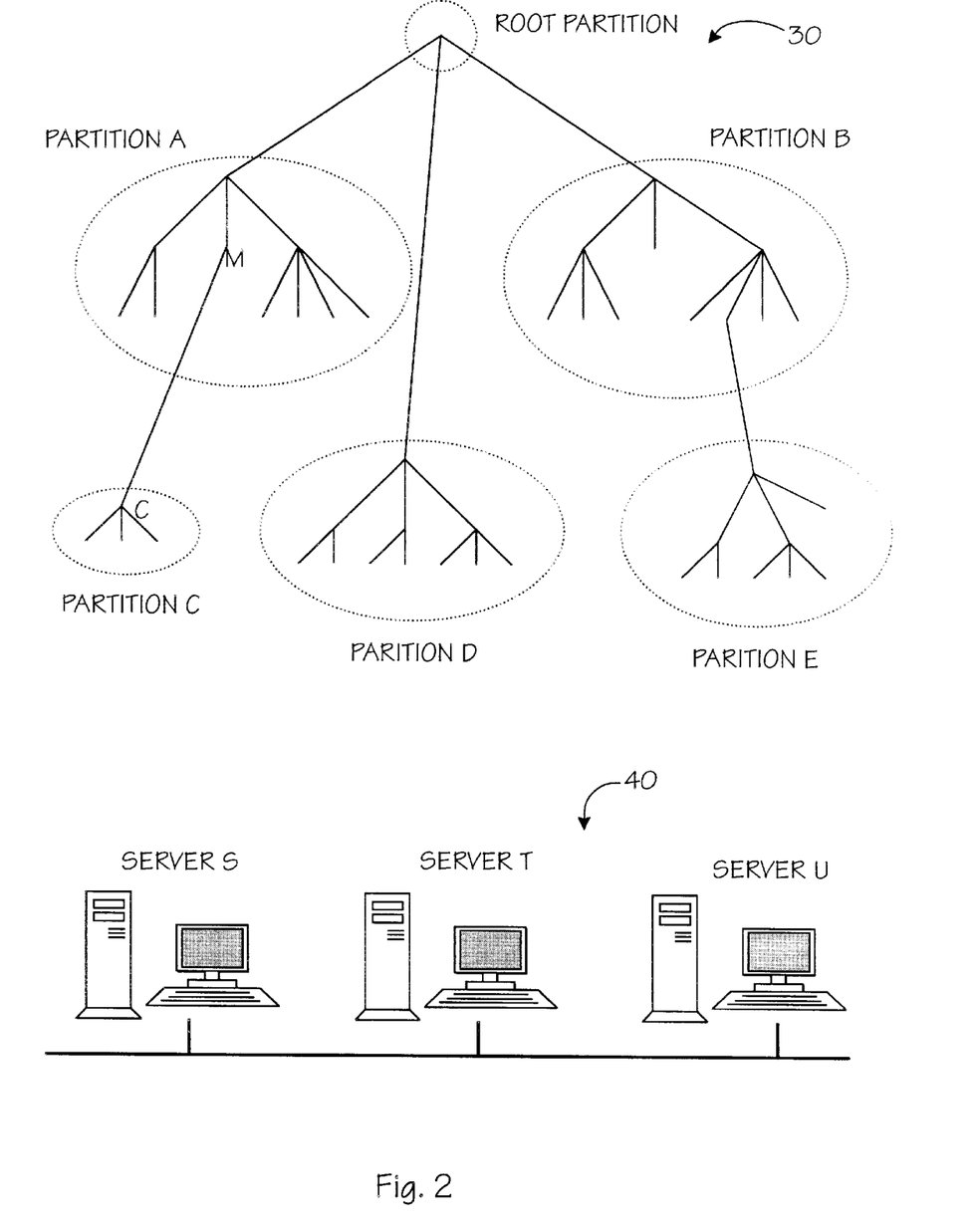
FIG. 2 depicts an example of a distributed directory and several servers accessing the distributed directory.

As shown in FIG. 2, the objects within the distributed directory 30 are often organized in a hierarchical structure, generally in the form of a tree, where the branching points and leaves represent the objects. In this hierarchy, objects closer to the root are superior or parents to objects further from the root, which are considered subordinate or children. For instance, the object M is the parent of the child object C. Object M can also be referred to as the container to object C. The distributed directory 30 is additionally organized in partitions, as illustrated by the dashed ellipses, with each partition comprising a plurality of objects organized as a logical sub-tree. Like objects, partitions closer to the root of the distributed directory 30 are called parent partitions to those further from the root, which are called child partitions. Each partition takes the name of the root object of the sub-tree. For instance, the root object of Partition C is the object C.

Multiple replicas of the partitions are stored across the network 40, wherein each insular server node holds a unique set of partitions and therefore a unique set of objects within that insular node. For instance, the following table demonstrates a sample partition organization in NDS:

replica of its partition data. Rather, it is a skeleton: it stores only attributes to the partitions root most object. Whenever a server holds a complete replica (i.e. Master, Secondary or Read Only) of a partition, but not a directly subordinate partition, it keeps a subordinate reference of the subordinate partition. Referring to FIG. 2 and the table, Server T holds a subordinate reference for Partition C (since it keeps a replica of Partition A) and Partition E (since it keeps a replica of Partition B). Server T ends up with a replica of each partition when subordinate references are included. Likewise, Server U holds a subordinate reference for Partition C (since it keeps a replica of Partition A). But Server U does not hold a replica of each partition: the Root Partition is absent. With subordinate references, a server can walk up and down the name tree across partition boundaries.

The distributed directory is a loosely synchronized database. An update made at one replica does not appear instantaneously at the other replicas. As such, it is possible that when an attribute value has been updated recently, a client could get a different result when reading attributes from different servers. A replication system is used to replicate or synchronize different objects changes in the distribute directory throughout the other servers accessing the distributed directory. One way of achieving this replication or synchronization is using the partition as a unit of data replication. An update made at one replica propagates to other replicas over time. Once the update ceases, the replicas converge to identical values. The server keeps a time stamp for each value of each attribute of each entry, identifying when and where that value was last modified. Since there can be competing updates at different replicas, the time stamps are used to determine which update is later. Doing so ensures that whenever multiple servers receive competing updates, each server with get the same result.

When a change is made locally to an entry in the distributed directory, a process in the server wakes up to propagate the change to all the replicas of the partition. Preferably, there is a brief time delay to allow a cluster of updates to be propagated in one session. This propagation proceeds one replica at a time through the replica list of a partition. After a server successfully sends all pending updates to one replica (or if the operation fails), it goes on to the next

|  | Root | Partition A | Partition B | Partition C | Partition D | Partition E |
|---|---|---|---|---|---|---|
| Server S | Master | — | Master | Master | Read Only | Master |
| Server T | Read Only | Master | Secondary | — | Master | — |
| Server U | — | Read Only | Secondary | — | Read Only | Secondary |

As suggested by this table, there are three basic kinds of replicas in NDS. With a Read Only replica, clients can read entries from this replica, but cannot change entries. Each partition can have zero or more Read Only replicas. With a Secondary replica, clients can read, write, create and destroy entries in the distributed directory by accessing this replica. Each partition has zero or more Secondary replicas. A Master replica acts like a Secondary replica, but clients can additionally make structural changes by accessing the master replica, such as splitting and combining partitions, or creating and removing replicas. Each partition has exactly one Master replica.

In addition to the three types of replicas illustrated in the table, a fourth kind of partition, called subordinate references, are also used to coordinate partitions between a plurality of nodes. A subordinate reference does not store a replica until all replicas have been updated. Replicas not updated in one round of the synchronization process are rescheduled for a later synchronization cycle. Also, obituaries keep track of information pending transmission to other servers. Obituaries are attribute values not visible to clients, but are used in server-server exchanges. Since obituaries are attribute values, they are synchronized using the same mechanism as the updates and are replicated across the distributed directory.

Security

Figure 3:
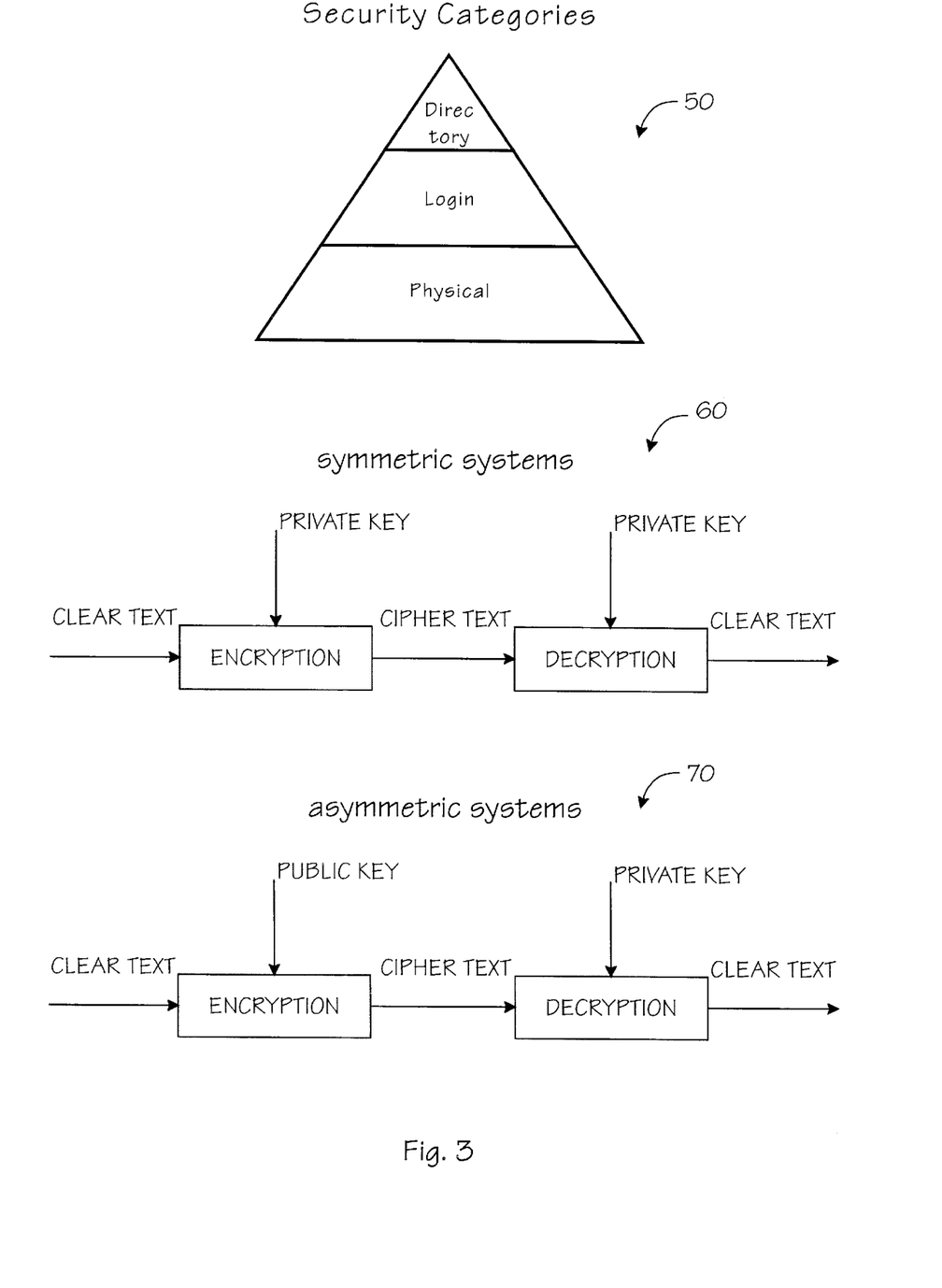
FIG. 3 depicts an access control mechanism and two examples of encryption and decryption systems.

Access to network resources and objects can be regulated to preserve security. This is particularly desirable as networks become larger and hold more important information. The access control mechanism 50 represented in FIG. 3 illustrates three examples of network security: physical security, log in security, and directory security. Each of these examples of security regulate access to a network and its resources, and can be used independently or in conjunction with one another, or with other forms of security. As the name implies, physical security refers to limiting physical access to a given network resource. For instance, servers in a client/server network are often maintained in a locked room with limited access. As a further example of physical security, a file server console or a workstation can be locked requiring a password or key to access or utilize the server or workstation, respectively.

Login security can vary greatly from one computer system to the next. One form of login security comprises a login phase and an authentication phase. The login phase typically involves prompting a source (such as a user, a program, a resource, etc.) which is attempting to enter the system for a name and a password. After successfully proving knowledge of the password, the source receives an encrypted private key from a server. Next, a credential is used in conjunction with the private key to generate a signature. In the authentication phase, the public key of the server is read by the source. The signature and credential generated during the login phase is used to create a proof, which is sent to the server. The proof is verified by the server through a computation using the source's public key stored in the source's object. If the proof is correct, then authentication is successful and the source is allowed access to the system. After successfully completing the authentication phase, the source has "logged in" the system and is represented by an object identity on the distributed directory. The login phase is typically performed only once. However, if, for example, a connection needs to be made to other network servers, the authentication phase can be repeated through a process known as background authentication. This involves subsequent verification by servers using the proof and the public key without additional intervention by the source.

Directory security is usually used in conjunction with login security, where directory security is not used unless login security has been first verified. While directory security can vary greatly, it generally comprises two parts: file system security and object security. File system security provides access control to files and directories, and basically involves assigning trustee rights and file/directory attributes. Trustee rights assignments can be granted to any object in the distributed directory including container objects, user objects, group objects, and organization roles. Examples of such rights include access control, supervisor, read, write, create, erase, modify, and file scan. In contrast, file/directory attributes control what actions can or cannot be taken on a file or directory. For example, certain files could be flagged as "read only" and "shareable" to prevent any unintentional or intentional deletions of such files or directories.

On the other hand, object security provides access control to directory objects and associated operations. Object security generally includes object rights, property rights, and access control lists ("ACL's"). Object rights are granted to a particular object to access or manage another object. Examples of such rights include supervisor, browse, create, delete, and rename. In contrast, property rights enable a trustee to view or change the values of a particular object's properties. A trustee could have rights to certain properties or to all properties of a particular object. For example, the supervisor property right over an object grants supervisor privileges for all properties in that object. All other rights assignments made at the object level, however, are not affected by the property rights. In fact, supervisor rights at the property level do not grant supervisor rights at the object level. Only the reverse is true. The ACL is a special property of every object, which contains trustee assignments for an object and its properties. In one embodiment, an ACL is a tabulated property containing three entries: the trustee ID, the type of access (i.e. object or property), and the actual rights assignment. A user object, for example, with the write right to the ACL of another user object has what is known as "managed rights" over the user object. This means that an object with the write right of an object ACL can make any rights assignments to that object.

FIG. 3 also illustrates two examples of encryption and decryption systems 60, 70. Generally, such systems scramble clear text (e.g. a textual message, a document, a program, a secret code, etc.) into cipher text which is unusable, unrecognizable, and is very difficult to transform back into the original clear text without the use of a secret key. The secret key is analogous to a physical key that is used to lock a pad lock: to decrypt the cipher text, the corresponding secret key must be used. Symmetric systems 60 are the most common type of systems. They are known as symmetric because the same private key is used for both encryption and decryption. Clear text and a private key are entered into an encryption system, which transforms the clear text into cipher text. If the same private key is introduced with the cipher text to a decryption system, the identical clear text will result. Typically, the symmetric keys are changed often to preserve security. Some of the more common symmetric systems are RC2, RC4, and the Data Encryption Standard ("DES").

The asymmetric system 70 uses two different keys: a public key and a private key. The private key is kept private by the owner of the private/public key pair and the public key is typically distributed or published to anyone who requests it (often by means of a certificate). The public key is used to encrypt clear text into cipher text, and the private key is used to decrypt the cipher text back into clear text. The asymmetric systems tend to be significantly slower than the symmetric systems. One of the most common asymmetric systems is the RSA Public-Key Cipher.

EXAMPLES

Figure 4:
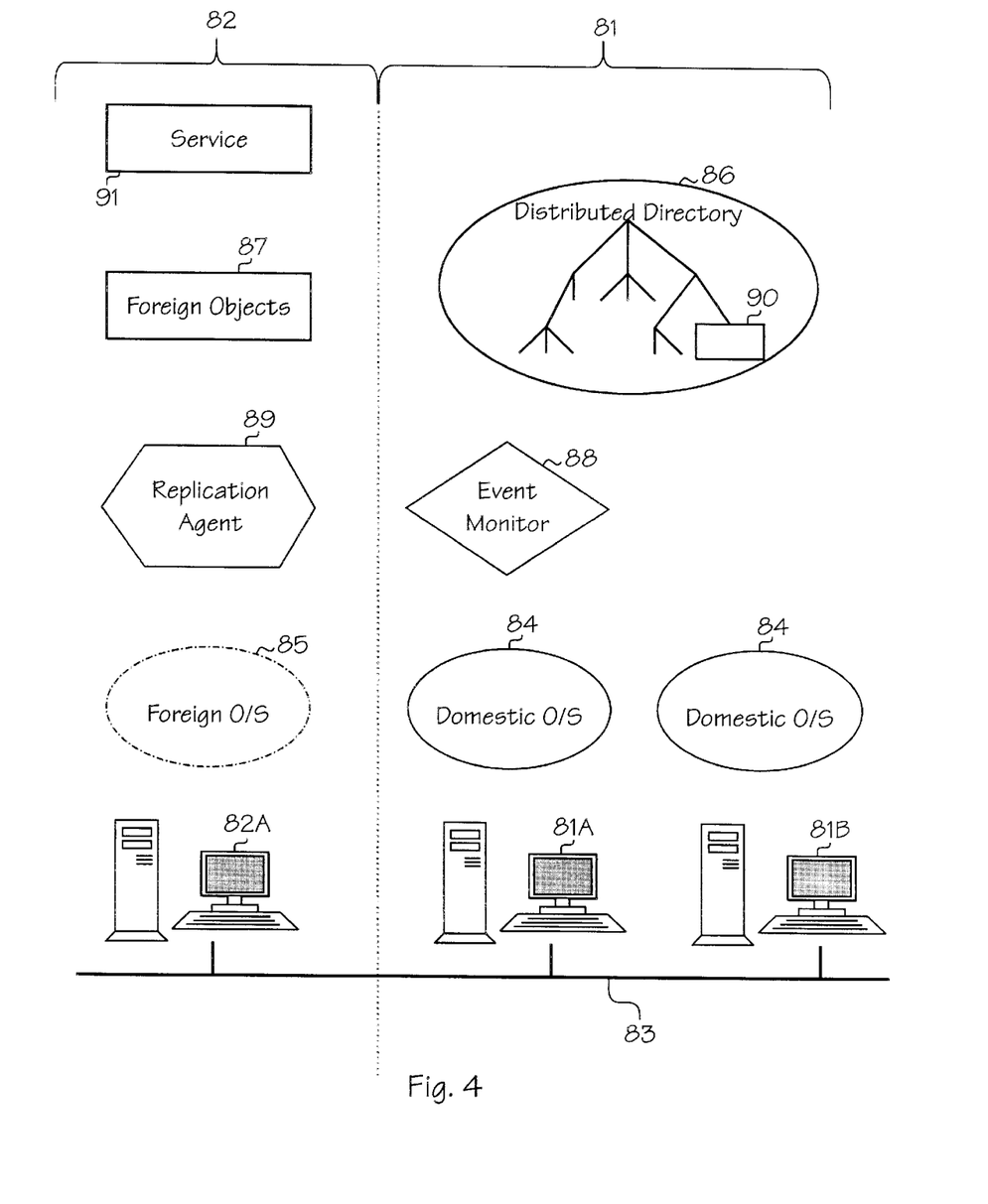
FIG. 4 depicts a schematic view of an administration system for managing foreign objects.

FIG. 4 illustrates an administration system 80 for managing a heterogenous network. In this example, the heterogenous network includes two computer systems 81, 82 interconnected through the communication link 83. The domestic computer system 81 in this example includes the computers 81a, 81b which are interconnected with the communication link 83. However, the domestic computer system could be a singular computer or a server with clients. Each of the computers 81a, 81b use the same domestic operating system 84, and as such can readily communicate with one another using the same protocols. The foreign computer system 82 includes the computer 82a, which can comprise a server, a work station, an entire separate network of computers, or the like. The terms "domestic" and "foreign" are used to indicate heterogenous components. In this embodiment, the foreign computer system 82 uses a foreign operating system 85. For instance, if the domestic operating system 84 is UNIX, then the foreign operating system 85 could be NETWARE, WINDOWS NT, or some other operating system.

The management service 86, which in this example is a distributed directory, operates on the domestic computer system 81. As one with ordinary skill in the art will readily appreciate, the management service 86 is not limited to distributed directories. The foreign computer system 82 has its own set of objects or identities 87, which are accessed by various services and applications in the foreign computer system 82. The management service 86 includes a set of representation objects 90 within the distributed directory for representing the foreign objects 87. Preferably, the representation objects 90 correspond exactly to the foreign objects 87. As part of the distributed directory, the representation objects 90 are adapted to be administered by the management service 86.

An event monitor 88 operates on the domestic computer system 81. The event monitor 88 is operative to take appropriate actions when changes are detected to the representation objects 90. Suitable event monitors are known in the art, and can be a separate program, a thread from the management service, a function in a library, or the like. Such changes will typically be made through the user interface of the management service 86, but could also occur through a background process. Examples of detectable changes include modifying, adding or deleting objects from the set of representation objects 90. Detectable changes can additionally include manipulations of objects elsewhere in the management service 86 which are relevant to the foreign objects 87. When a change is detected, the event monitor 88 sends a message to the foreign computer system 82 relating to the changes to the representation objects 90. For instance, the message could be a notice that a change has occurred, or the message could contain substantive information about the change. Such messages are sent over the communications link 83 and are received by a replication agent 89 in the foreign computer system 82.

The replication agent 89, upon the receipt of messages from the event monitor 88, synchronizes the foreign objects 87 to correspond to the changes made to the replication objects 90 in the domestic computer system 81. If the message is only a notice, the replication agent will retrieve the substantive information about the change from the management service 86. Effectively, the administration system 80 acts as a one-way synchronization between the replication objects 90 and the foreign objects 87.

Using the administration system 80, services and resources in a heterogenous network, regardless of whether they are located on the domestic 81 or foreign 82 computer system, can be managed through a centralized management service 86. For example, consider a service 91, whether it be an application running on the foreign computer system 82 or the management service of the foreign computer system 82, wherein the service 91 accesses and uses of the foreign objects 87. Since the foreign objects 87 are represented by the representation objects 90 within the centralized management system 86, and the foreign objects 87 are synchronized with the representation objects 90, network administrators need not worry about manipulating or managing the foreign objects 87 on the foreign computer system 82. Instead, network administrators need only go to the centralized management service 86 to administer and change all of the objects within the heterogenous network.

Figure 5:
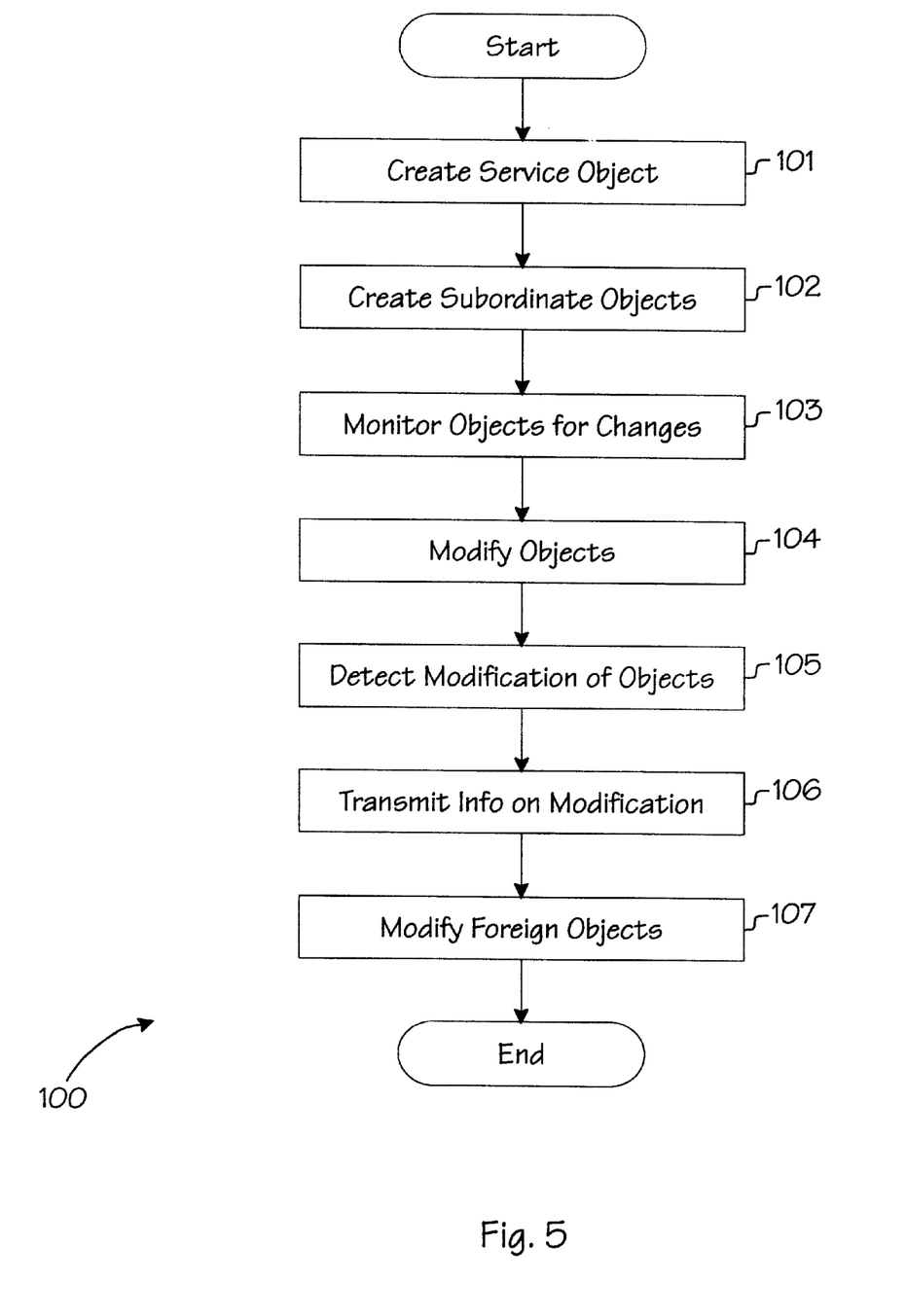
FIG. 5 depicts a flow chart of a method for managing a foreign service.

FIG. 5 illustrates a method of managing the service 91 on the foreign computer system 82 through the management service 86 operating on the domestic computer system 81. Preferable, the method 80 is embodied as instructions on a computer readable medium. The service 91 has access to the foreign set of objects 87 on the foreign computer system 82. For instance, foreign objects 87 could be accessed to determine access control to the service 91. In the optional step 101, a service object is created in the management service 86 for representing the service on the foreign computer system 82. This step 101 is particularly desirable where the management service 86 is a distributed directory. At step 102, the representation set of objects 90 are created, which objects are accessible to the management service 86. Should a service object be created in step 101, it is preferred that the set of representation objects 90 be subordinate to the service object, whereby the service object will be the container for the representation objects 90.

In optional step 103, the representation objects 90 are monitored for any changes, preferable by the event monitor 88 or some other mechanism. In steps 104 and 105, the second set of objects are modified, which can include modifying, adding or deleting objects within the set, and such modifications are detected. For instance, the access rights to the foreign service could be changed. Alternatively, a new user object could be added. If the management service 86 is a distributed directory, it is preferred that the replication mechanism of the distributed directory propagate the modification to any replicas that may exist.

At step 106, information about the modification to the representation objects 90 is transmitted to the foreign computer system. In one embodiment, the information comprises specific details about the change. In another embodiment, the information comprises a notice that a change has been made. The actual details about the change are recorded in a cache, such as a file on a nonvolitile computer readable medium, or can be determined upon a search or dredge of the management service 86. When the replication agent 89 is ready to retrieve the detailed change information, the replication agent opens the cache and/or searches the management service 86 to determine the changes, the details of which are transmitted to the foreign computer system. Preferably the replication agent 89 will delete the cache after reading it. Optionally, the replication agent 89 maintains a time stamp after the change information was retrieved (i.e., when the cache is written or when the directory was searched). Only changes made after the time stamp are of interest to the replication agent. One benefit of this optional embodiment is that any changes made by the management service 86 to the replication objects 90 will be preserved in the event the foreign computer system 82 crashes or is otherwise not capable of communicating with the domestic computer system 81.

At step 107, the foreign objects 87 are modified to correspond to the modification made to the second set of objects in the domestic computer system 81. In other words, the foreign objects 87 will be synchronized with the representation objects 90. The service 91, which accesses and uses the foreign objects 87, is therefore being administered through the management service 86 located on the domestic computer system 81.

Figure 6:
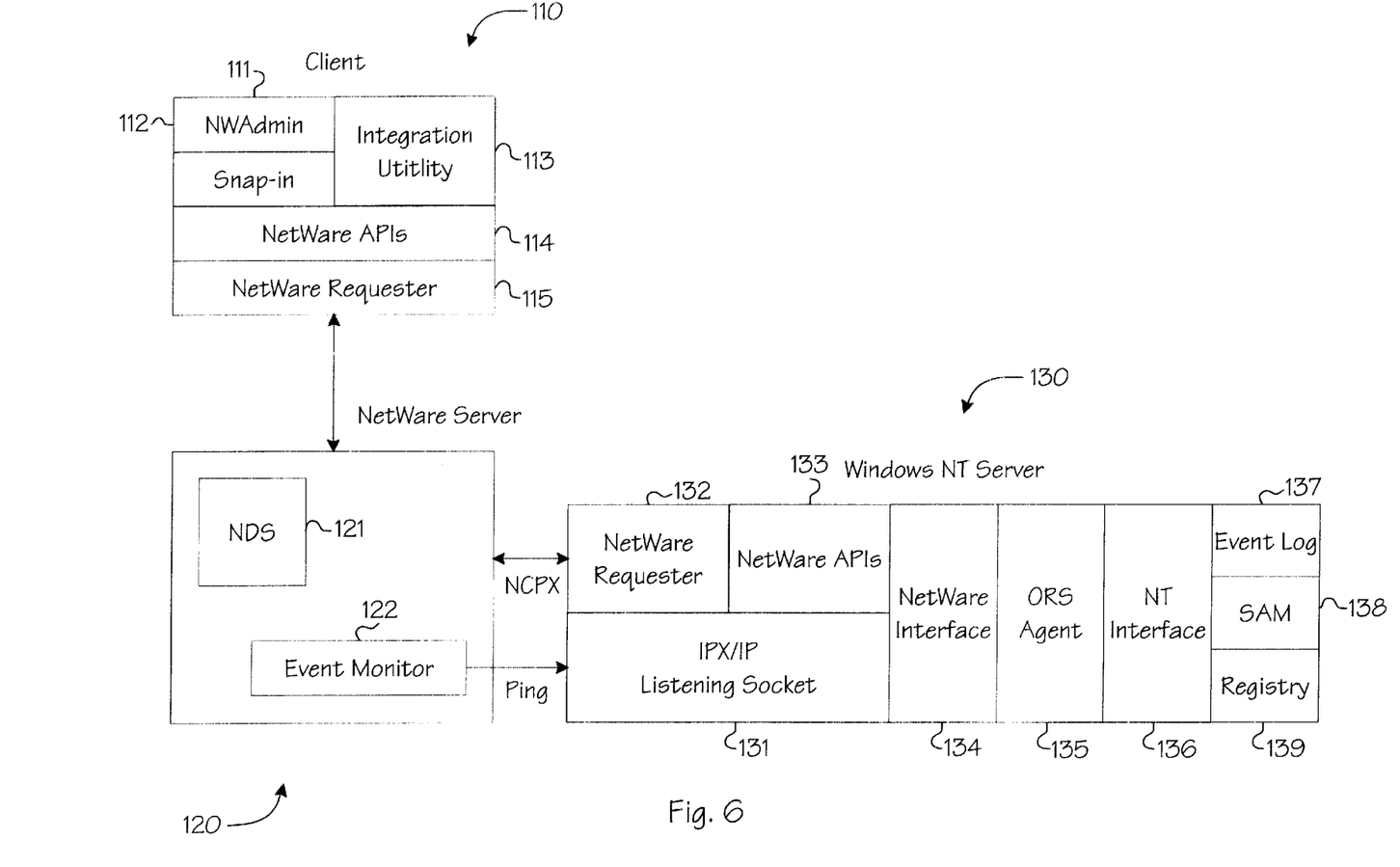
FIG. 6 depicts an example of the present invention managing a WINDOWS NT server.

FIG. 6 illustrates another example of the present invention. The WINDOWS NT server 130 is connected through a communication link (not shown) to the NETWARE server 120. The NT server 130 uses the WINDOWS NT operating system and the NETWARE server 120 uses the NETWARE operating system. The SAM 138, or SECURITY ACCOUNT MANAGER, is a service on the NT server 130 which accesses a centralized database organized in domains, which database forms part of the SAM 138. Among other things, the SAM 138 contains information on users on the NT server 130 and contains authoritative information on access rights to the NT server 130. The event log 137 is an NT facility for recording any errors that may occur relating to SAM 138. The registry 139 maintains configuration data relating to SAM 138.

The client machine 110 is part of a client/server network and works in cooperation with the NETWARE server 120. In this embodiment, the NETWARE server 120, by itself or in combination with the client 110, is considered the domestic computer system. While the client 110 may use an operating system other than NETWARE (for instance MSDOS, WINDOWS 95, UNIX, or the like), the client 110 and the NETWARE server 120 can nevertheless be considered part of the same computer system (i.e. the domestic computer system). The NT server 130 is considered the foreign computer system.

Since the client 110 and server 120 use different operating systems, a translator is used so the two operating systems can understand one another. In this example, this translator is the NETWARE requester 115. The requester 115 is the network provider which enables the client 110 to communicate with the NETWARE server 120. The requester 115 converts communications in IPX/IP format and places these packets onto the communications link between the client 110 and the server 120. Likewise, the NT server 130 has its own requester 132 which places packets onto the communications link in IPX/IP format. Both the client 110 and the NT server 130 have access to a variety of NETWARE API's 114, 133 (or application program interfaces) which include a series of functions that enable the client 110 and NT server 130 to interact with NDS 121. One with ordinary skill in the art is very familiar with NETWARE API's and the infrastructure of communications between machines, details of which are published in NOVELL'S NETWARE CLIENT SDK, release no. 8, which is hereby incorporated by reference.

An administration utility 111 on the client 110, in this case NWAdmin, is a user interface front end for NDS 121. Objects from NDS 121 are displayed to represent the hierarchical relationship of the tree. Using a variety of available commands in NWAdmin 111, assuming the client 110 has appropriate rights, objects in NDS can be viewed, modified, added and deleted. The Snap-in utilities 112 provided customized user interfaces in NWAdmin 111 to modify and view representation objects that correspond to and represent the foreign objects in the SAM 138.

Among other uses, the integration utility 113 is used to migrate the existing objects (i.e. users and groups) from SAM 138 to NDS 121. The integration utility 113 translates information about relevant objects in SAM to corresponding objects in NDS. The integration utility sends an NCPX request over an authenticated connection to the event monitor 122. The event monitor returns a file name to the integration utility and sends a ping to the NT server 130, which is received by the IPX/IP listening socket 131. The ping is passed to the ORS agent 135 which reads the SAM 138 and writes the information requested in the NCPX request to the file. The integration utility 113 then accesses, reads, and deletes the file.

The objects in SAM are matched to corresponding object classes in the NDS schema. The values corresponding to the SAM objects are transmitted and populated in the NDS objects created from the classes. In this example, the schema for NDS was extended include several new classes specifically designed to represent the SAM objects. Each of the extended classes include a set of attributes that closely mirror the corresponding the attributes of the foreign objects. For instance, if a particular object in SAM has attributes X, Y and Z, the corresponding NDS object class will also have attributes X, Y and Z. In this example, the integration utility 113 is also used to convert the flat domain structure of SAM to the hierarchical structure of NDS through the extended classes.

The extended classes supported in this example include NTWorkStation, NTDomain, NTUser, NTHybridUser, NTLocalGroup, and NTGlobalGroup. NTWorkStation and NTDomain are container objects designed to represent the SAM of foreign computer system. As the names indicate, NTWorkStation is designed to represent an NT workstation, and NTDomain is designed to represent an NT server, which is also referred to as an NT domain. The replication service on the NT workstation or NT domain will authenticate to NDS as the container object, which objects have rights as a restricted user having rights only to it and its subordinate objects. As such, any security breaches from the NT server will not jeopardize the security of the distributed directory.

Objects created from the remaining classes are placed subordinate to the container objects in NDS. NTUser and NTHybridUser are designed to represent the user objects on SAM. NTUser is designed to represent a user object existing only on SAM. Where a user object exists both in NDS and in SAM, the NTHybridUser class is used. Attributes common to NDS's and SAM's user objects are maintained in the NDS user object, which is maintained elsewhere in the NDS tree. As values are mapped from SAM to NDS, the values associated with common attributes are populated in the NDS user object. If a conflict between a SAM and NDS value should exist, the NDS value trumps. Values unique to SAM are populated in the NTHybridUser object, which is place subordinate to the container object. A reference is established between the NDSUser object and the NTHybridUser object. The NTLocalGroup and NTGlobalGroup objects are designed to represent the local and global groups for that NT domain, which are used to manage NT resources.

In this embodiment the event monitor 122 is a NETWARE LOADABLE MODULE ("NLM") that runs on the NETWARE server 120. A separate event monitor runs on each server in the client/server network that has a master replica of a partition. Optionally, event monitors can be run on servers with read/write replicas to assist in load management. Each event monitor registers with NDS using the API NWDSERegisterForEvent. This API registers a function to be used as a callback when a specific NDS event occurs. Preferable, the event monitor 122 is configured to be notified when object of a predetermined type is added, deleted, or modified. These object types include the extended classes, discussed above, as well as NDSUser.

After the event monitor is registered with NDS, NDS will notify the event monitor of any events that have occurred. The event monitor will ignore events to NDSUser objects, unless such objects have a reference to a SAM object representation. To increase network performance, it is preferred that when the event monitor receives the notice from NDS, the event monitor will start a new thread with any tasks that may be required. The NETWARE server will then process that new thread at a convenient time when there is system availability, thus minimizing the effect of downstream processing of the calling thread.

If the modification event is relevant to the SAM, the event monitor will split modification events into two categories: dredgeable and non-dredgeable. Dredgeable modifications are those which can be determined upon examining the object in NDS. Non-dredgeable modifications are those which are not readily determined by examining the current state of NDS. For instance, non-dredgeable events include create, delete, rename and move. Non-dredgeable events are stored in a temp file, called a cache, which contains information about the modification event. Preferably the cache is centrally located, such as with the master replica of the partition, because the network might have more than one server with replicas of that partition. By keeping a centralized cache, inconsistencies between the replicas are avoided.

The event monitor sends a ping to the replication agent, which in this embodiment is the combination of the NETWARE interface 134, the object replication agent ("ORS agent") 135, and the NT interface 136. The ping is a message that contains little or no substantive information about the modification, but is nevertheless related to the modification because it is a notification that a modification has occurred. The NETWARE interface 134 is responsible for sending and receiving NCPX requests and replies. The NT interface 136 is responsible for reading and writing to SAM in the native protocols to the WINDOWS NT operating system. The ORS agent 135 is the manager which directs the NETWARE and NT interfaces 134, 136 and translates received messages. Upon receipt of the ping, the ORS agent 135 establishes an authenticated connection with the server that issued the ping. The ORS agent 135 requests the identity of the master replica from the NETWARE server 120 that issued the ping. The ORS agent 135 then goes the server holding the master replica and retrieves the cache. After reading the cache, the ORS agent deletes the file. Then, the ORS agent sends an NCPX request to the event monitor to scan NDS for dredgeable events in the NETWARE server 120 that sent the ping. The event monitor will request an NDS dredge and will write the dredgeable events to a file, which name is returned to the ORS agent. The ORS agent then accesses, reads and deletes the file.

The ORS agent 135 maintains a time stamp from the last time modification information was retrieved from the NETWARE server 120 (i.e., when the cache was written or when the dredge was performed). Should the ORS agent 135 be unable to establish a connection, whether it be due to the NT server 130 being down or for some other reason, the modification events will be preserved in the current state of the NDS (dredgeable events) or in the cache (non-dredgeable events). If the ORS agent 135 has not receive a ping over a predetermined period of time, the ORS agent will send an NCPX request to the event monitor for updated information from NDS. Since the events are preserved, the ORS agent 135 can retrieve the modification data made after the last time stamp, once a connection is reestablished with the NETWARE server 120.

With the modification information, the ORS agent 135 modifies the objects in SAM to correspond with the modification made in NDS. This is achieved through the NT interface 136, at the direction of the ORS agent 135, using the native protocols and functions in the NT server 130. As such a secure one-way synchronization is established between the NDS and SAM.

Figure 7:
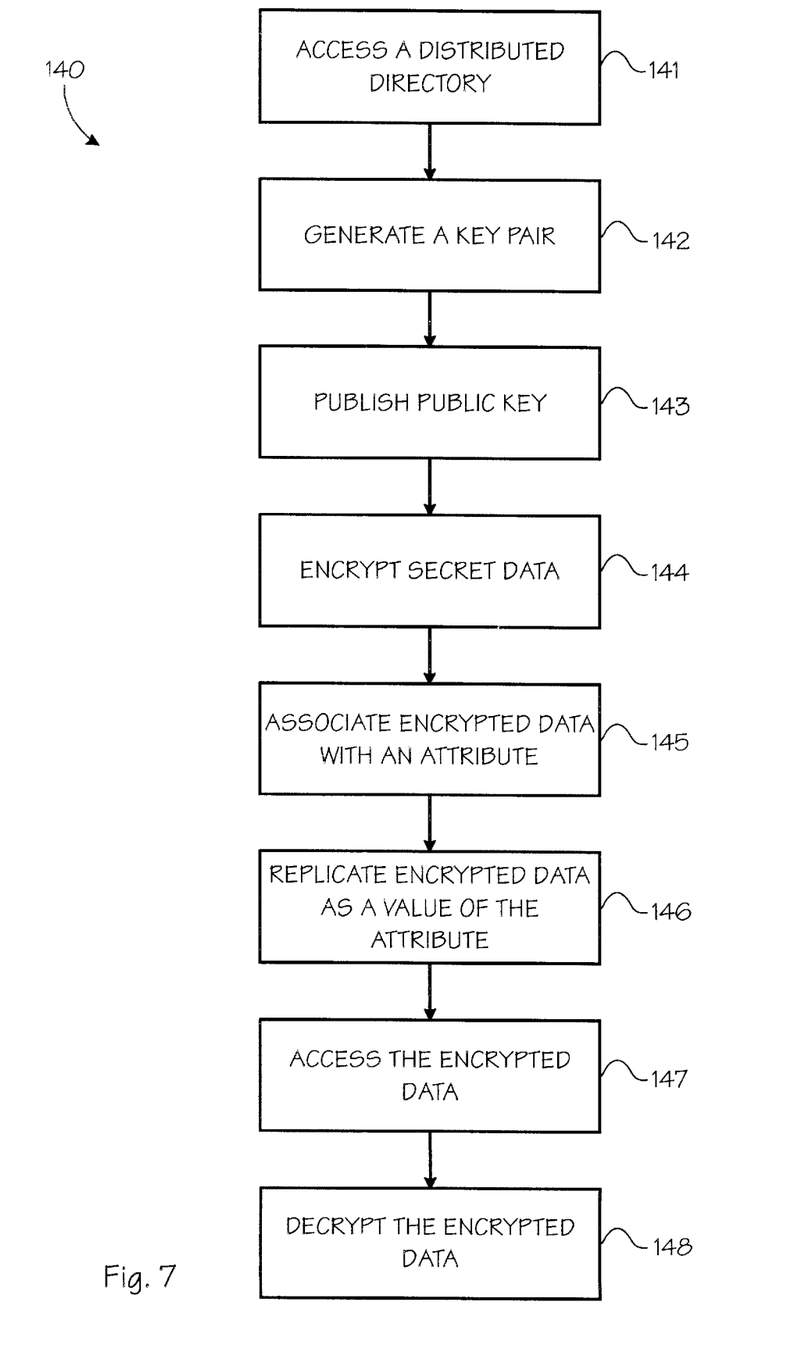
FIG. 7 depicts a flow chart of a method for securely synchronizing passwords.

Preferably, password information in NDS and SAM will be synchronized while at the same time preserving the secrecy of the password. Therefore, users will not have to remember multiple sets of passwords for each application server on the network. As depicted in FIG. 7, which shows a process that preferably takes the form of a program in a computer readable medium, the first step 141 involves the NT server 130 accessing NDS 121. Next, step 142 involves the ORS agent 135 generating a private/public key pair. At step 143, the public key is published.

Continuing to step 144, the password is encrypted using the public key. The resulting encrypted data is then associated with an attribute of an object in NDS in step 145. For instance the encrypted password can be entered as a value for the "Authentication" attribute of the user object 20 to which the password applies. As the changed value for the attribute is replicated through NDS in step 146, the event triggers the event monitor 122, which will in turn trigger the ORS agent 135. In steps 147 and 148, the ORS agent 135 retrieves and decrypts the encrypted data using the private key. Then, the ORS agent 135 makes the appropriate native function calls in the NT server 130 to associate the password with a corresponding object in the foreign system 96. As such, the password is securely synchronized.

Figure 8:
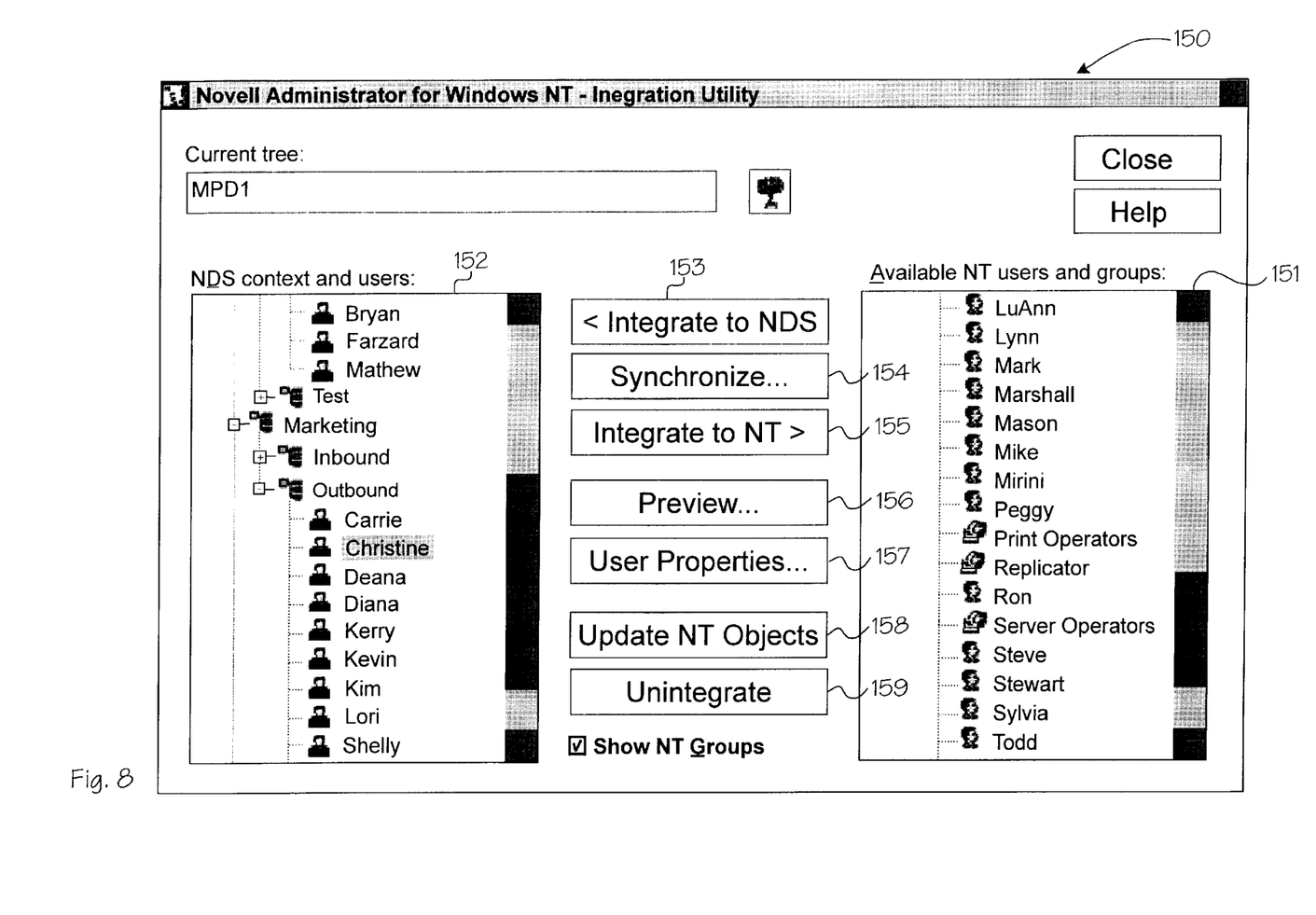
FIG. 8 depicts a user interface for an integration utility.

FIG. 8 depicts a user interface 150 for the integration utility 113. One of the functions of the integration utility 113 is to convert the flat model of SAM 138 into the hierarchical model of NDS 121. Preferably, only users having rights as network administrators will have access rights to use the integration utility 113. The right pane 151 contains a list of the NTUser and NTGroup objects in NDS, which are subordinate to the service object. The left pane 152 is a navigator and allows the user to view any portion of the NDS tree. Using this interface 150, an NTUser object can be represented in the NDS tree by selecting the NTUser object in the right pane 151 and selecting a container object in the left panel 152. The integrate to NT command 153 will become available, which upon execution will create an NDSUser object subordinate to the selected container object and convert the selected NTUser object to an NTHybridUser object. The NTUser values will populate the NDSUser object and a reference between the NDSUser object and the NTHybridUser object will be created. This operation can also be achieved for multiple selected NTUser or NTGroup objects.

Existing NDSUser objects in the left pane 152 can be synchronized to NTUser objects in the right pane 151 by selecting each of the respective objects, which will make available the synchronize command 154. Upon its execution, the synchronize command 154 will convert the NTUser object to an NTHybridUser object, populate the NDSUser with any values not already entered (NDS values trump SAM values), and create a reference between the NTHybridUser object and the NDSUser object. The preview command 156 displays any conflicts or differences in data between the NT and NDS objects before they are synchronized. Existing NDSUser objects can be integrated to SAM by selecting the NDSUser object in the left pane 152 and the service container object, and executing the integrate to NT command 155. A new NTHybridUser object will result with a reference to the NDSUser object. With either the synchronize or integrate to NT commands 154, 155, the NDS information will be written to files which can be accessed and transmitted to the ORS agent, and then written to SAM.

The user properties command 157 displays options to change properties for a selected user object before integrating. For instance, a password can be modified before integration occurs.

The update NT objects command 158 migrates and converts the NT users and groups into NDS objects. These will become the representation objects subordinate to a selected service object. The integration utility 113 sends an NCPX request to the event monitor 122, which then passes that command to the NT server 130. The ORS agent 135 then retrieves the information from SAM 138 and writes it to a file, which is accessed by the integration utility 113. No communication exists directly between the NT server 130 and the integration utility 113.

The unintegrate command 159 severs the link between an NDSUser object and an NTHybridUser object. The NTHybridUser object is transformed back into an NTUser object, with the most recent updates to the NDSUser object being used to populate the NTUser object attributes. As changes are replicated through NDS, the values in the NDSUser object may not be synchronized. To prevent the loss of any data between replicas, it is preferred that the values are consistent between the replicas, which can be achieved by using unique object identifiers between the replicas.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. For instance, the invention has been illustrated in the context of networked computers, however, the invention can be used with any interconnect nodes. Likewise, the invention has utility in systems other than NDS and NETWARE, including, for example, the management services in WINDOWS NT, WINDOWS 95, OS/2, MACINTOSH, VINES, UNIX, etc. Accordingly, this invention is intended to embrace all such alternatives, modifications, and variations that fall within the spirit and broad scope of the impended claims.

What is claimed is:

1. A computer system for managing a heterogeneous network, comprising:
   a) a first service operating on a first computer;
   b) a first set of objects on the first computer, said first set of objects being accessed by the first service;
   c) a second computer having a communication link with the first computer;
   d) a distributed directory management service operating on the second computer and being distinct from the first service, said distributed directory comprising a plurality of editable objects, each of said editable objects having one or more attributes with associated values;
   e) a second set of objects in the distributed directory corresponding to and representing the first set of objects;
   f) an event monitor being operative to send messages relating to changes detected in the second set of objects; and
   g) a replication agent for receiving messages from the event monitor over the communication link and for modifying the first set of objects to correspond with the changes in the second set of objects in the distributed directory.

2. A computer system as recited in claim 1, wherein the first computer is an application server using an operating system different from that of the second computer.

3. A computer system as recited in claim 2, wherein the replication agent retrieves from the management service substantive information relating to the detected changes.

4. A computer system as recited in claim 1, wherein the first service is the management service of the first computer.

5. A computer system as recited in claim 1, wherein the changes include modifying, adding or deleting objects in the second set of objects.

6. A computer system as recited in claim 1, wherein an event monitor operates on each server in a client/server network that has a master replica of a partition of the distributed directory.

7. A computer system as recited in claim 6, wherein changes to the subordinate objects are synchronized to replicas of the subordinate objects through the replication system of the distributed directory.

8. A computer system as recited in claim 1, wherein the computer system maintains a time stamp of the last communication with the replication agent.

9. A computer system as recited in claim 1, further comprising a first service object in the distributed directory for representing the service on the first computer.

10. A computer system as recited in claim 9, wherein the second set of objects are subordinate to the service object in the distributed directory.

11. A method of managing a heterogenous network, the method comprising the steps of:
    a) operating a first service on a heterogenous network having a first computer system having a first operating system and a second computer system having a second operating system, the first service having access to a first set of objects on the first computer system;
    b) operating on the second computer system a management service distinct from the first service;
    c) creating a second set of objects accessible to the management service for representing the first set of objects;
    d) modifying the second set of objects through the management service;
    e) detecting the modification to the second set of objects;
    f) transmitting to the first computer system information about the modification to the second set of objects; and
    g) modifying the first set of objects on the first computer system to correspond to the modification to the second set of objects in the second computer system.

12. A method as recited in claim 11, further comprising the step of replicating the modification to the second set of objects to any replicas in the distributed directory.

13. A method as recited in claim 11, wherein the information about the modification to the second set of objects comprises a notice that a modification has been made.

14. A method as recited in claim 13, further comprising the step of maintaining a time stamp of the last communication between the first and second computer systems.

15. A method as recited in claim 14, wherein the step of transmitting comprises dredging the distributed directory for any modifications to the second set of objects made after the time stamp, and transmitting such modifications to the first computer system.

16. A method as recited in claim 11, further comprising the step of storing at least a portion of the modifications to the second set of objects in a file accessible to the first computer system.

17. A method as recited in claim 11, wherein the step of modifying includes modifying, adding, or deleting objects in the second set of objects.

18. A method as recited in claim 11, wherein the first service authenticates to the management service as a user with restricted rights.

19. A method as recited in claim 11, further comprising the step of synchronizing passwords between the first and second computer systems.

20. A computer readable medium comprising instructions capable of performing the method of claim 11.

21. An administration system for a heterogenous network, the administration system comprising:
    a) a first computer system comprising one or more identities;
    b) a management service on a second computer system for managing objects on the second computer system, the second computer system being distinct from the first computer system;
    c) one or more objects on the second computer system representing and being distinct from the one or more identities, said one or more objects being adapted to be managed by the management service;
    d) an event monitor operating on the second computer system, said event monitor being operative to send messages relating to changes to the one or more objects; and e) a replication agent operating on the first computer system, said replication agent being operative to receive messages from the event monitor and being operative to synchronize the one or more identities to the changes made to the one or more objects.

22. An administration system as recited in claim 21, wherein the one or more objects are part of a distributed directory.

23. An administration system as recited in claim 21, wherein the changes include modifying, adding or deleting objects.

24. An administration system as recited in claim 21, wherein changes to the one or more objects are made through the management service.

25. An administration system as recited in claim 21, further comprising an integration utility operable for creating the one or more objects on the second computer system.

26. An administration system as recited in claim 25, wherein the integration utility is further operable for creating identities on the first computer system which correspond to objects on the second computer system.

27. An administration system as recited in claim 21, further comprising a service object on the second computer system for representing a service on the first computer system.

28. An administration system as recited in claim 27, wherein the service has access to the one or more identities.

29. An administration system as recited in claim 27, wherein one or more objects are subordinate to the service object.

30. An administration system as recited in claim 21, wherein the first and second computer systems use different operating systems.

31. An administration system as recited in claim 21, wherein the message is a notice.

\* \* \* \* \*